(12) United States Patent
Gupta et al.

(10) Patent No.: US 6,816,966 B1
(45) Date of Patent: Nov. 9, 2004

(54) TECHNIQUES FOR SECURING DATA FLOW IN INTERNET MULTICASTING

(75) Inventors: Amit Gupta, Mountain View, CA (US); Paul W. Jardetzky, Stanford, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 980 days.

(21) Appl. No.: 08/885,817

(22) Filed: Jun. 30, 1997

(51) Int. Cl.$^7$ .............................................. H04L 9/00
(52) U.S. Cl. ...................................................... 713/163
(58) Field of Search ............................. 380/30, 21, 25; 713/163

(56) References Cited

U.S. PATENT DOCUMENTS

| | | | | |
|---|---|---|---|---|
| 5,036,518 A | * | 7/1991 | Tseung | 714/748 |
| 5,109,384 A | * | 4/1992 | Tseung | 714/748 |
| 5,144,665 A | * | 9/1992 | Takaragi et al. | 380/30 |
| 5,150,411 A | * | 9/1992 | Maurer | 380/30 |
| 5,237,565 A | * | 8/1993 | Henrion et al. | 370/236 |
| 5,369,705 A | * | 11/1994 | Bird et al. | 380/21 |
| 5,416,842 A | * | 5/1995 | Aziz | |
| 5,548,646 A | * | 8/1996 | Aziz et al. | 380/23 |
| 5,588,060 A | * | 12/1996 | Aziz | 380/30 |
| 5,592,552 A | * | 1/1997 | Fiat | 380/21 |
| 5,602,841 A | * | 2/1997 | Lebizay et al. | 370/413 |
| 5,633,933 A | * | 5/1997 | Aziz | 380/30 |
| 5,634,011 A | * | 5/1997 | Auerbach et al. | 709/242 |
| 5,652,795 A | * | 7/1997 | Dillon et al. | 380/25 |
| 5,668,877 A | * | 9/1997 | Aziz | 380/30 |
| 5,748,736 A | * | 5/1998 | Mittra | 380/21 |
| 5,754,938 A | * | 5/1998 | Herz et al. | 455/4.2 |
| 5,754,939 A | * | 5/1998 | Herz et al. | 455/4.2 |
| 5,812,552 A | * | 9/1998 | Arora et al. | 370/401 |

OTHER PUBLICATIONS

Eastlake et al., "Domain Name System Security Extensions", Network Working Group, RFC 2065, Category: Standards Track, Jan. 1997, pp. 1–41.

Waitzman et al., "Distance Vector Multicast Routing Protocol", Network Working Group, RFC 1075, Nov. 1988, pp. 1–24.

A. Ballardie, "Core Based Trees (CBT) Multicast Routing Architecture", Inter–Domain Multicast Routing (IDMR), Internet Draft, May 1997, pp. 1–17.

Deering et al., "Protocol Independent Multicast–Sparse Mode (PIM–SM): Motivation and Architecture", Network Working Group, Internet Draft, PIM–SM Architecture, Oct. 1996, pp. 1–25.

Semeria et al., "Introduction to IP Multicast Routing", Internet Draft, Category: Informational, Apr. 1996, pp. 1–54.

(List continued on next page.)

*Primary Examiner*—James W. Myhre
(74) *Attorney, Agent, or Firm*—Osha & May L.L.P.

(57) ABSTRACT

Multicast communications are expanded to include the concept of private multicasts. An address space dedicated to multicast is partitioned into a subspace for public multicasts and a subspace for private multicasts. A public key/private key encryption pair is used for private multicasts and installed on domain name servers or on certification authorities. Portions of a multicast join request are sent together with a corresponding encrypted version. Private multicast equipped routers receive the multicast join request, retrieve the public key from a domain name server or from a certification authority and decrypt the encrypted portion of the join request to determine if the requester is authorized. Group specific multicast joins are also permitted by sending a bit-mask identifying a group of senders which are authorized or prohibited from sending to a user joining a multicast.

15 Claims, 10 Drawing Sheets

OTHER PUBLICATIONS

W. Fenner, "Internet Group Management Protocol, Version 2", Internet Engineering Task Force, Inter–Domain Multicast Routing Working Group, Internet–Draft, Obsoletes: Appendix I of RFC 1112, Jan. 20, 1997, pp. 1–23.

Estrin et al., "Protocol Independent Multicast (PIM), Dense Mode Protocol Specification", draft–ietf–idmr–PIM–DM–spec–04.ps, Sep. 12, 1996, pp. 1–7.

"Introduction to IP Multicast Routing: A technical overview of IP Multicast routing protocols and their features", IP Multicast Initiative (IPMI), Stardust Technologies, Inc., 1995–1997, pp. 1–12.

* cited by examiner

| NETWORK ADDRESS | ALIAS |
|---|---|
| ⋮ | ⋮ |
| 300 → 221.0.96.3 | JKL.COM ← 310 |
| ⋮ | ⋮ |

Figure 3

| NETWORK ADDRESS | ALIAS | OWNER | PUBLIC KEY | OPTIONAL PUBLIC/ PRIVATE FLAG |
|---|---|---|---|---|
| ... | ... | ... | ... | ... |
| 221.0.96.3 | MULTICAST.host.sponsor.com | abc123@host.sponsor.com | AXJY931ZFDE271...KJ | 1 |
| ... | ... | ... | ... | ... |

400 → NETWORK ADDRESS
410 → ALIAS
420 → OWNER
430 → PUBLIC KEY
440 → OPTIONAL PUBLIC/PRIVATE FLAG

| HEADER | JOIN | ADDRESS | CRC |
|---|---|---|---|

FIGURE 7A

| HEADER | JOIN | ADDRESS | LIST OF SENDERS PERMITTED TO SEND TO THIS ADDRESS | LIST OF SENDERS PROHIBITED FROM SENDING TO THIS ADDRESS | CRC |
|---|---|---|---|---|---|

FIGURE 7B

| HEADER | JOIN | ADDRESS | 32 BIT MASK - PROPERTY | ... | 32 BIT MASK - PROPERTY | CRC |
|---|---|---|---|---|---|---|
| | | | ⌒760 | | ⌒770 | |

TECHNIQUES FOR SECURING DATA FLOW IN INTERNET MULTICASTING

BACKGROUND OF THE INVENTION

1. Field of the Invention

The invention relates to telecommunications systems and more particularly to securing data flow in Internet multicasting.

2. Description of Related Art

Many emerging Internet applications involve one-to-many or many-to-many communications, where one or multiple sources are sending to multiple receivers. Examples are the transmission of corporate messages to employees, communication of stock quotes to brokers, video and audio conferencing for remote meetings and telecommuting, and replicating databases and web site information. IP Multicast efficiently supports this type of transmission by enabling sources to send a single copy of message to multiple recipients who explicitly want to receive the information. This is far more efficient than requiring the source to send an individual copy of the message to each requester (referred to as point-to-point unicast), in which case the number of receivers is limited by the bandwidth available to the sender. It is also more efficient than broadcasting one copy of the message to all nodes (broadcast) on the network, since many nodes may not want the message, and because broadcasts are limited to a single subnet.

IP Multicasting is a receiver-based concept: a receiver joins a particular multicast session group and traffic is delivered to all members of that group by the network infrastructure. The sender does not need to maintain a list of receivers. Only one copy of a multicast message will pass over any link in the network, and copies of the message will be made only where paths diverge at a router. Thus multicast yields many performance improvements and conserves bandwidth end-to-end.

IP Multicasting is described in more detail in two documents published by the IP Multicast Initiative. The first is entitled "How IP Multicast Works" and the second is entitled "Introduction to IP Multicast Routing". These documents are attached to the specification as Appendixes A and B, respectively. These documents are hereby incorporated by reference into the specification in their entirety.

A related approach to multicast security using encryption of datastreams is known in which a sender encrypts outgoing information for decryption at a receiver. This is commonly done using public key encryption techniques.

The Problems

IP Multicasting is based on a simple design—the sender simply sends the data to a multicast group address and the network automatically sends the data to everyone who expressed interest in receiving data on that multicast address. A significant problem is that this arrangement does not provide any security to data flow, that is, everyone can listen to a multicast session and everyone can send data to multicast sessions. As a result, there is no such thing as secure data flow in Internet multicasting sessions in the prior art. Further, since anyone can send to a multicast session, the potential for disruption by an interloper is significant.

SUMMARY OF THE INVENTION

Various aspects of the invention discussed herein provide apparatus, systems, processes, and computer program products for securing data flow in Internet Multicasting. This is done by splitting the multicast address space into two components, one for public multicast and one for private multicast. A public key of a public/private pair is installed on a domain name server or on a certification authority and is associated with the multicast address. A user, desiring to join a private multicast, provides certain information which is encrypted using the private key of the public/private key pair. Routing functions are typically performed by a switch at a node of a switching network or by a router in the network or by a computer which has a plurality of communications interfaces. As used herein, the term "routing element" applies to all. A routing element receives a join request, obtains the public key and compares some non-encrypted information with decrypted information for consistency. The routing element also performs certain other checks on the join request received. Only when the routing element is satisfied that the join request received is authentic does the routing element permit the join and forward the join request to the next routing element on the way to the source. Techniques are also provided for source-group specific joins and leaves which permit one to specify senders authorized to send to a receiver and to prevent unauthorized senders from sending data to the receiver.

One embodiment of the invention is directed to a routing element for routing multicast information. The routing element obtains a public key with which to decode part of a multicast join request to verify that a user is authorized to join a private multicast.

Another embodiment of the invention is directed to apparatus for participating in a multicast including a processor configured to send a private multicast join request.

Another embodiment of the invention is directed to a domain name server which stores records relating a multicast network address or alias with a public key of a public/private key encryption pair and which sends in response to a network address or alias received over a communications port, a public key corresponding to the address or alias.

Another embodiment of the invention is directed to a communications system for multicasting information from at least one source to a plurality of receivers, including a plurality of sub-networks and at least one router, connecting at least two sub-networks, configured to distinguish between public and private multicasts.

Another embodiment of the invention relates to a method of operating a communications system by providing a multicast address space having a subspace for public multicasts and a subspace for private multicasts.

Another embodiment of the invention relates to a method of sending a multicast join request, by sending first information including a user identification and an optional random key together with an encrypted version of said first information.

Another embodiment of the invention relates to a method of sending a multicast join request from a user by sending a list of bit-masks specifying at least one of a group of senders permitted to send to said user and a group of senders prohibited from sending to said user.

Another embodiment of the invention relates to a method of establishing a private multicast by creating a private/public key encryption pair, distributing private keys to authorized participants in the multicast; obtaining a private multicast address; and installing the public key for the multicast on a domain name server or on a certification authority.

Other embodiments of the invention relate to computer program products for carrying out the techniques described.

The foregoing and other features, aspects and advantages of the present invention will become more apparent from the following detailed description of the present invention when taken in conjunction with the accompanying drawings and Appendices A and B of this specification.

BRIEF DESCRIPTION OF DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
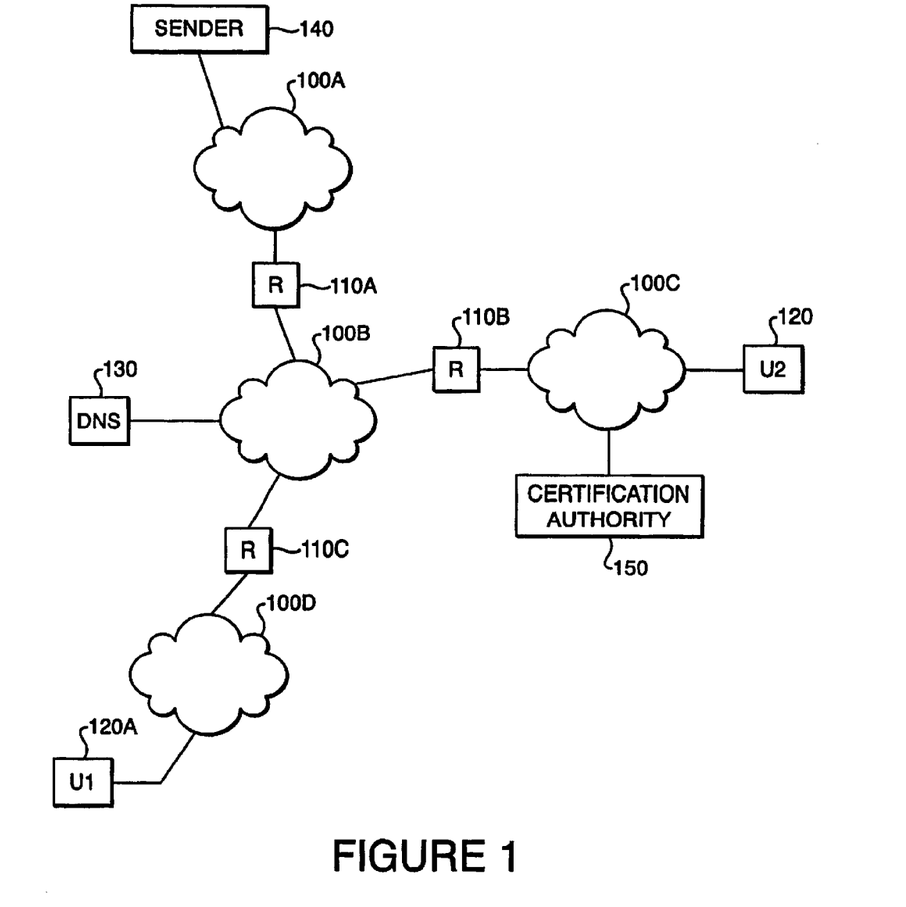
FIG. 1 is block diagram of an exemplary network arrangement linking a plurality of sub-networks in accordance with one aspect of the invention.

FIG. 1 is a block diagram of an exemplary network arrangement linking a plurality of sub-networks in accordance with one aspect of the invention. As shown in FIG. 1, a plurality of sub-networks 100A, 100B, 100C and 100D are connected together over routers 110A, 110B and 110C. In the network illustrated, domain name server 130 is resident on sub-network 100B and a certification server or authority 150 as resident on sub-network 100C. One or more senders 140 may be the intended source of information for the multicast to exemplary user stations 120A and 120B.

Figure 2:
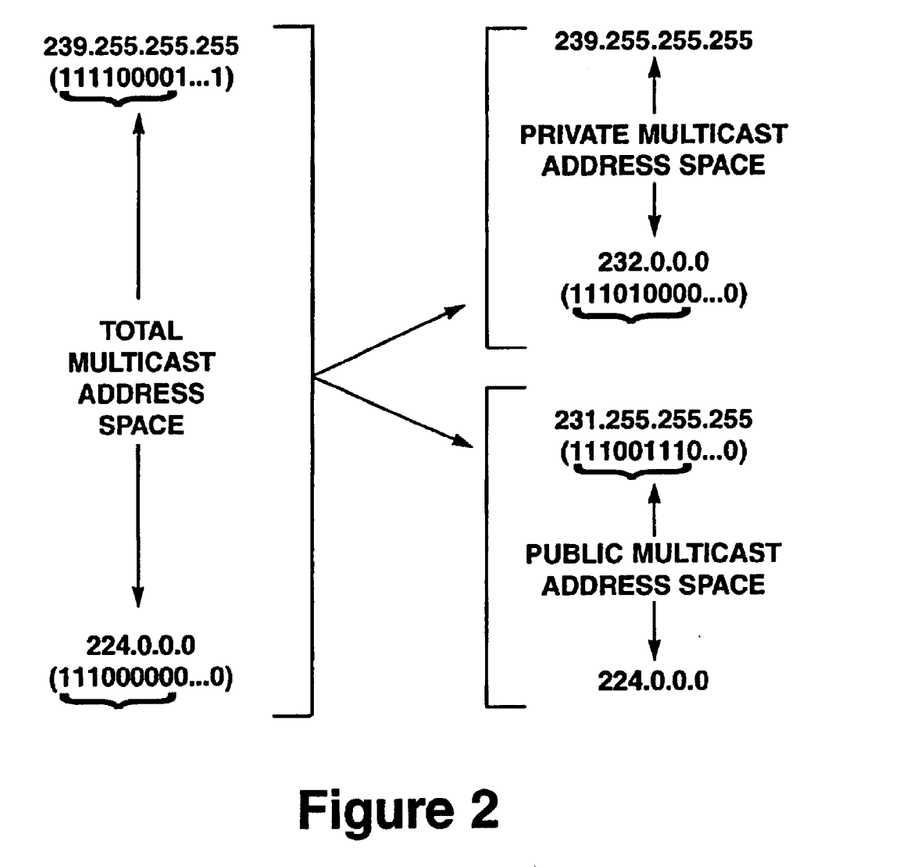
FIG. 2 is a illustration of how a multicast address space may be partitioned into a private multicast address sub-space and public multicast address sub-space, in accordance with one aspect of the invention.

FIG. 2 is an illustration of how a multicast address space may be partitioned into a private multicast address sub-space and public multicast address sub-space.

The left hand side of FIG. 2 represents the total multicast address space. That space ranges from 224.0.0.0 (in Internet standard dotted decimal notation) to 239.255.255.255. Underneath the dotted decimal representation is a parenthetical showing eight binary bits (bracketed) which corresponds to the numerical value of the first component of the dotted decimal notation). Each of the other components of the dotted decimal notation represent the value of a corresponding byte in a 32-bit (4 byte) address space utilized by the Internet. The notation of a binary value 1 or 0 separated by dots from another representation of the same binary value represents an indication that the remaining bits of the 32-bit address word have only those binary values contained therein. One of the important extensions to the multicast address space provided in accordance with the invention is a separation of the multicast address space into two components, the first of which is a public multicast address space and the second of which is a private multicast address space. As shown in FIG. 2, the public multicast address space ranges from 224.0.0.0 to 231.255.255.255. Similarly the private multicast address space ranges from 232.0.0.0 to 239.255.255.255. By this partitioning of the address space, one can tell immediately from a multicast address whether a private multicast is undertaken or a public multicast is undertaken.

Figure 3:
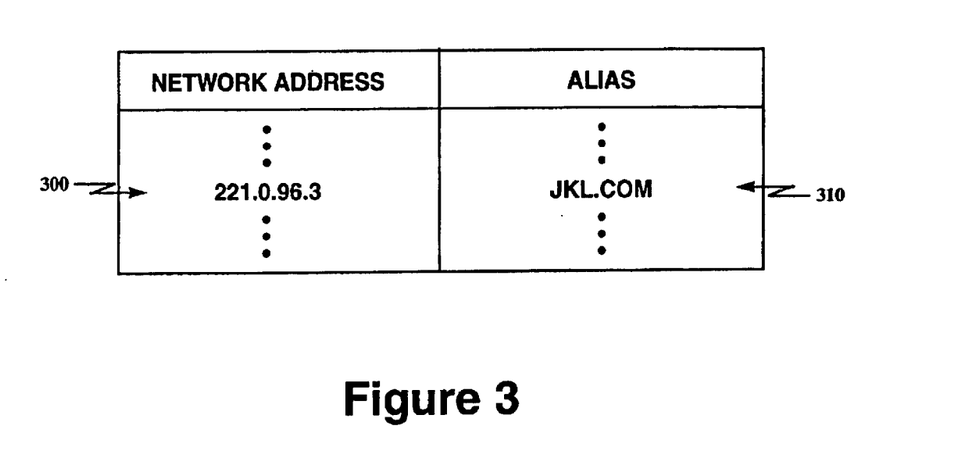
FIG. 3 is a database schema showing a typical domain name server record in accordance with the prior art.

FIG. 3 is a database schema showing a typical domain named server (DNS) record in accordance with the prior art. As shown in FIG. 3, a dotted decimal address 300 is mapped against an alias for that address 310 in respective columns of the database table.

Figure 4:
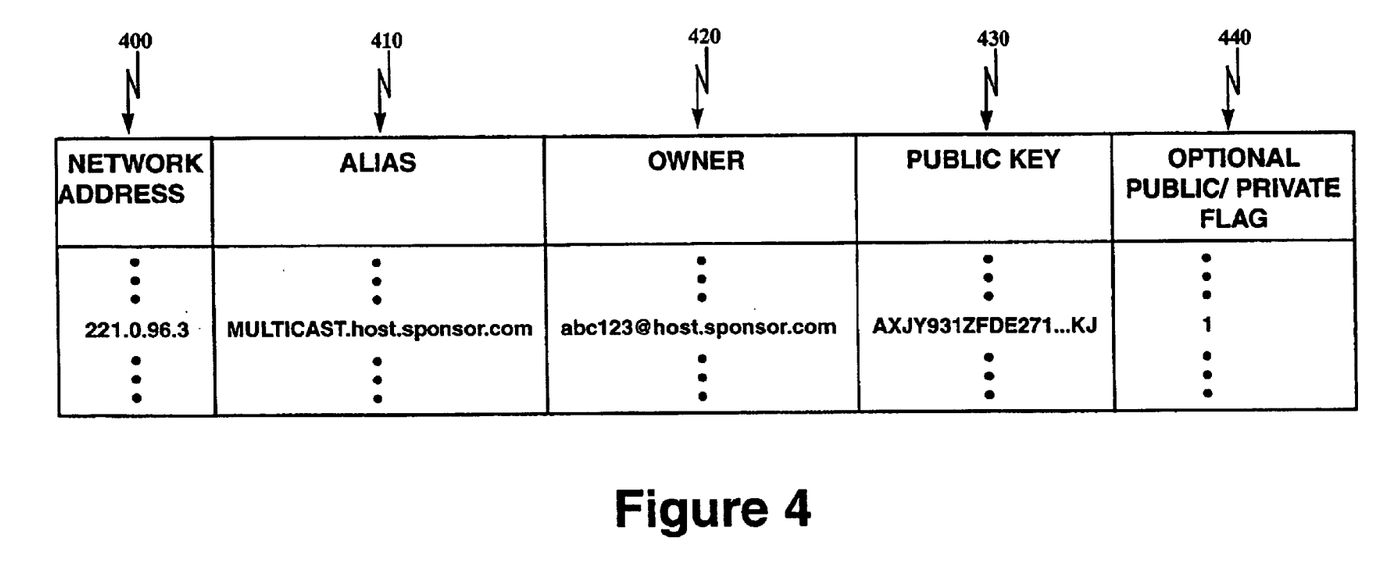
FIG. 4 is a database schema of a domain name server modified in accordance with one aspect of the invention.

FIG. 4 is a database schema of a domain name server modified in accordance with one aspect of the invention. Columns 400 and 410 correspond to approximately to the columns in which entries 300 and 310 of FIG. 3 occur. However, in column 410, instead of a fixed station address, an IP Multicast address is included. Column 420 contains entries which describe the owner of the multicast address. Typically this would be the person setting up the multicast. Column 430 contains a public key for each private multicast address. Column 440 contains an optional public or private flag which can be used to distinguish public and private multicasts if the address space is not partitioned.

When using a domain name server of the prior art, a query using either the network address or its alias will result in return of the other value shown in FIG. 3. When a domain name server is extended in accordance with the arrangement shown in FIG. 4, it is convenient that a query submitted with data from either column 400 or column 410 will result in return of the entire record matching the submitted value. Thus, if one were to search on the alias shown in column 410 of FIG. 4, one would retrieve not only the network address shown in column 400, the owner information shown in 420 but also the public key shown in column 430 for the multicast session. This ability to retrieve public keys is useful as described more in after.

Figure 5:
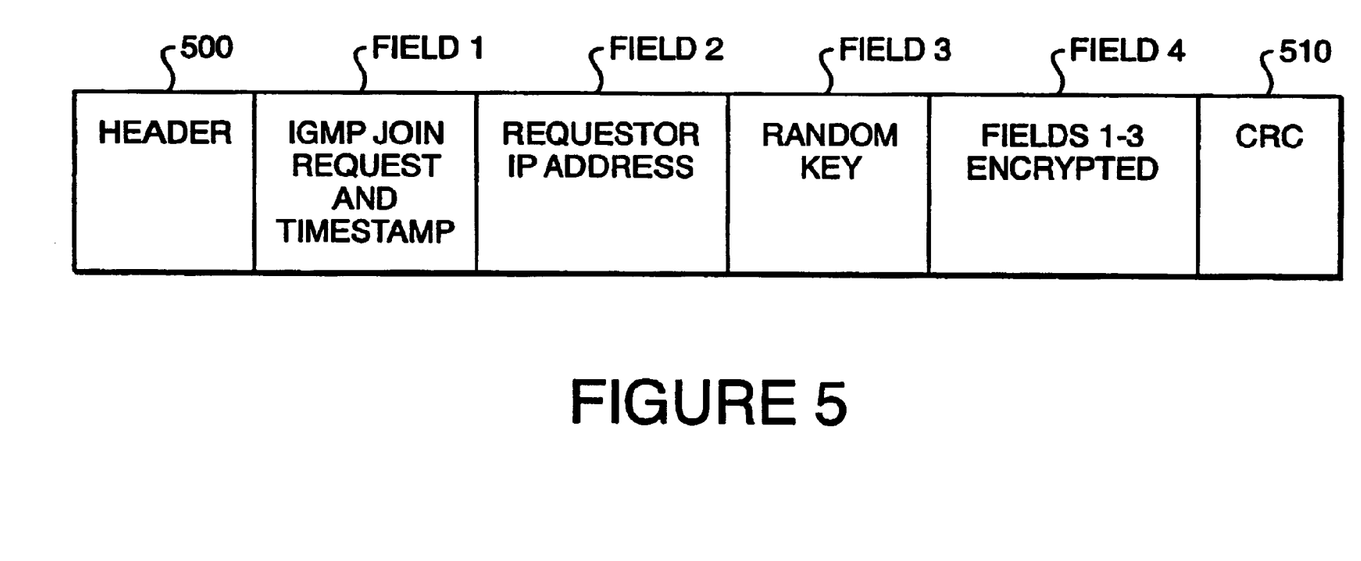
FIG. 5 is a diagram illustrating the extensions to an Internet Group Management Protocol (IGMP) join request in accordance with one aspect of the invention.

FIG. 5 is a diagram of extension to an Internet Group Management Protocol (IGMP) join request in accordance with one aspect of the invention. A header 500, and packet type shown in Field 1 together with a requester IP address shown in Field 2 would typically be part of prior art IGMP join request. In the extensions shown in accordance with one aspect of the invention, an optional timestamp may be placed in Field 1 and a random key, placed in Field 3, is generated by the requester. The contents of Field 1, Field 2 and Field 3 are encrypted or digested and the digest encrypted and placed into Field 4. The Cyclic Redundancy Check 510 (CRC) encompasses the full IGMP join request. How this extended join request is utilized is discussed more hereinafter.

Figure 6:
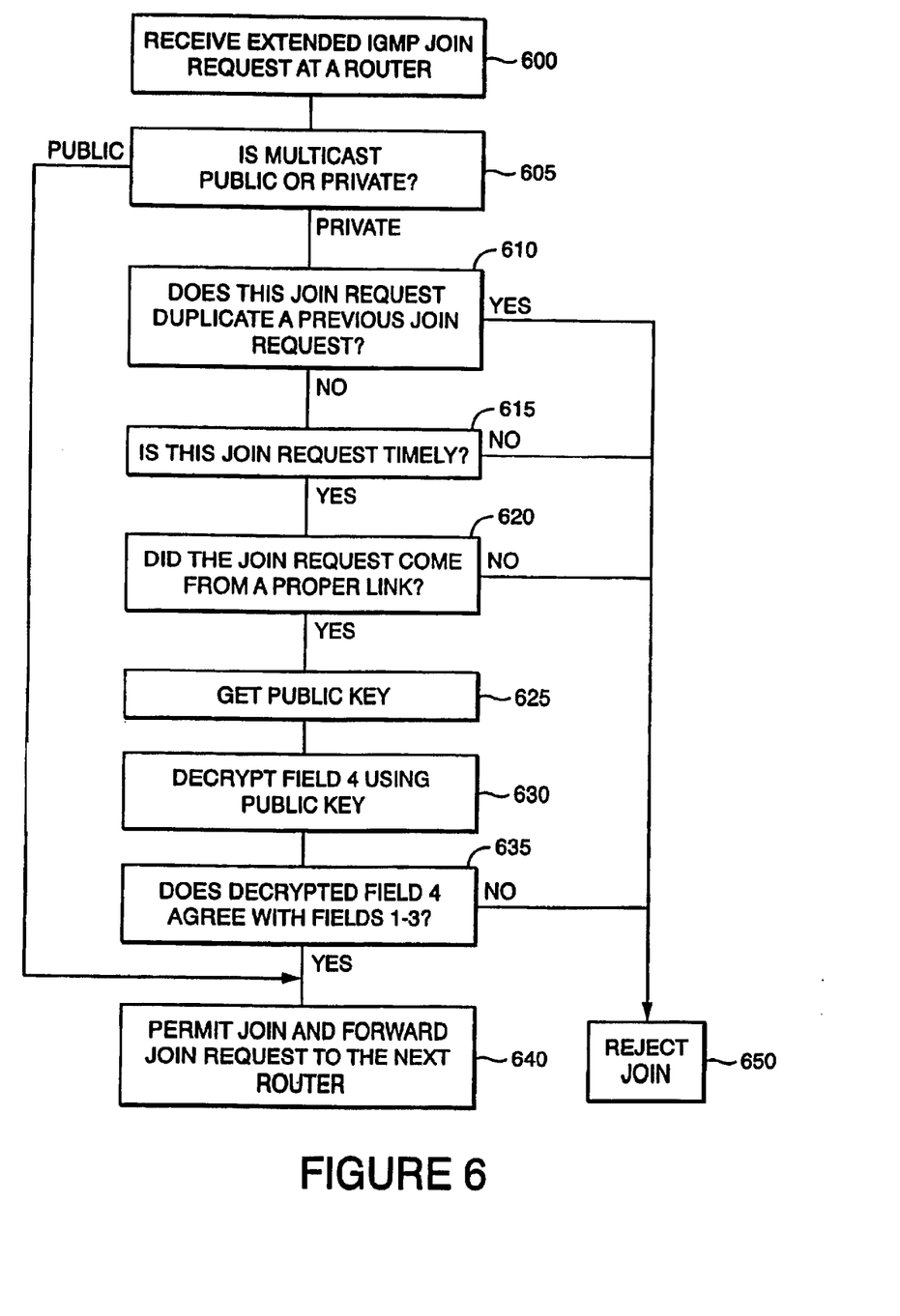
FIG. 6 is a flow chart of an exemplary router process for determining whether to permit or reject an IGMP join request in accordance with one aspect of the invention.

FIG. 6 is a flow chart of an exemplary routing element process for determining whether to permit or reject an IGMP join request in accordance with one aspect of the invention. When an extended IGMP join request is received at a router (600) determination is made from the address whether or not the multicast is public or private (605). If it is public (605-public), the join is permitted and the join request forwarded to the next routing element along the path, if any (640). If the multicast is private (605-private) a check is made to determine whether the join request submitted is a duplicate of a previous request. One way an unauthorized user may attempt to gain access to a multicast would be to duplicate a join request submitted by a previous user. If the submitted join request is a duplicate (610-y), the request is rejected. If it is not, a determination is made whether the join request is timely (615). This a simple check to see that the join request is appropriate for the day and time of the current multicast session. This would prevent a user from copying an earlier join request from an authorized user in an attempt to gain access to the current session. If the join request is not timely (615-N), the request to join is rejected. If it is timely, a check is made to determine whether the join request came from a proper link. If it did not (620-N), the join request is rejected. However, if it did, the routing element will obtain the public key dual corresponding to the private key utilized to encrypt the IGMP extended join request (625). Preferably, the public key is obtained from a domain name server, such as DNS 130 shown in FIG. 1. Alternatively, the public key could be obtained from a certification authority 150 shown in FIG. 1. Using the acquired public key, Field 4 of the extended IGMP join request is decrypted using the public key (630). The resulting information decrypted from Field 4 should agree with Fields 1–3. If it does, the join is permitted and the join request is forwarded to the next routing element. If it does not (635-n), the join request is rejected and the user will be denied access to the multicast by the router.

Figure 7A:
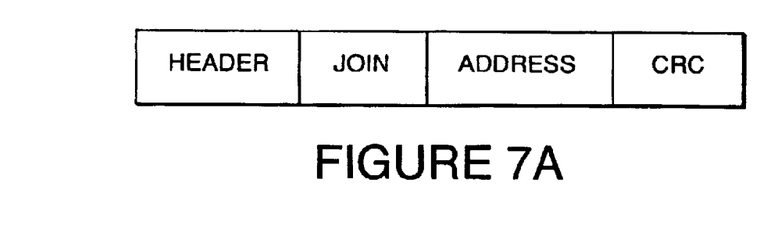
FIG. 7A shows a prior art IGMP join request.
Figure 7B:
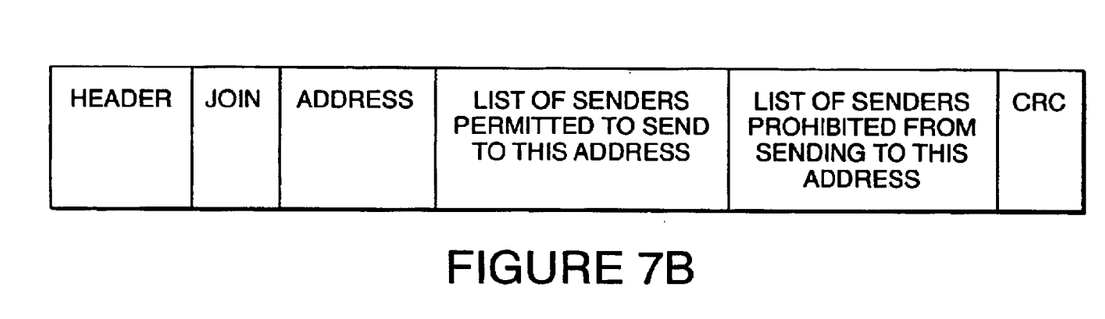
FIG. 7B shows a prior art extension to the IGMP join request of FIG. 7A.
Figure 7C:
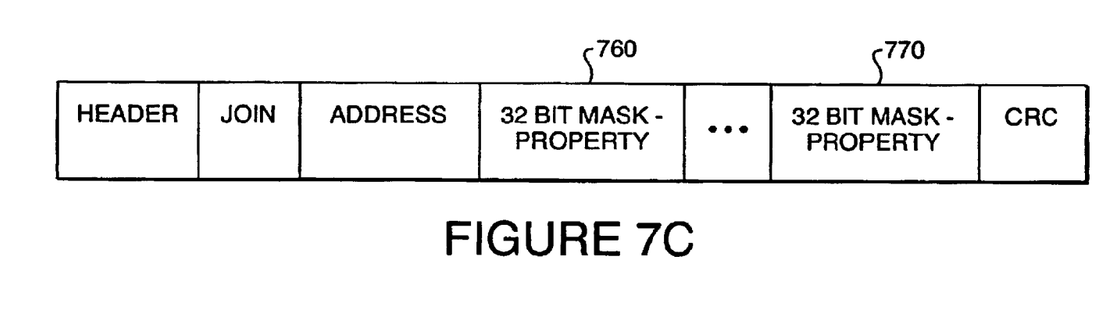
FIG. 7C shows an extension to IGMP join requests in accordance with one aspect of the invention.

A third aspect of the invention is illustrated in FIG. 7A, FIG. 7B and FIG. 7C. FIG. 7A shows a prior art IGMP join request.

FIG. 7B shows a prior art extension to the IGMP join request of FIG. 7A. The extension of the IGMP join request of FIG. 7B permits a lists of senders to be specified which are permitted to send to the address requesting the join. Similarly, it includes an list of senders prohibited from sending to the address requesting the join. This permits a participant in the multicast to inform routers to selectively prohibit packets from undesirable or disruptive sources from reaching the participant. It also permits the user to specify the list of senders from which the requesting station desires to receive information. This allows the filtering out of packets that the user does not desire to see.

FIG. 7C shows an extension to prior art IGMP join requests in accordance with one aspect of the invention. Field 760 and Field 770 permit the use of a list of 32-bit masks instead of a list of senders or receivers. Thus, by tailoring a mask, groups of addresses may be permitted to send to the address or barred from sending to the address, merely by specifying the bit-mask appropriate for the group and the property desired. For example, the property may be "permitted to send to this address" or "prohibited from sending to this address".

Figure 8:
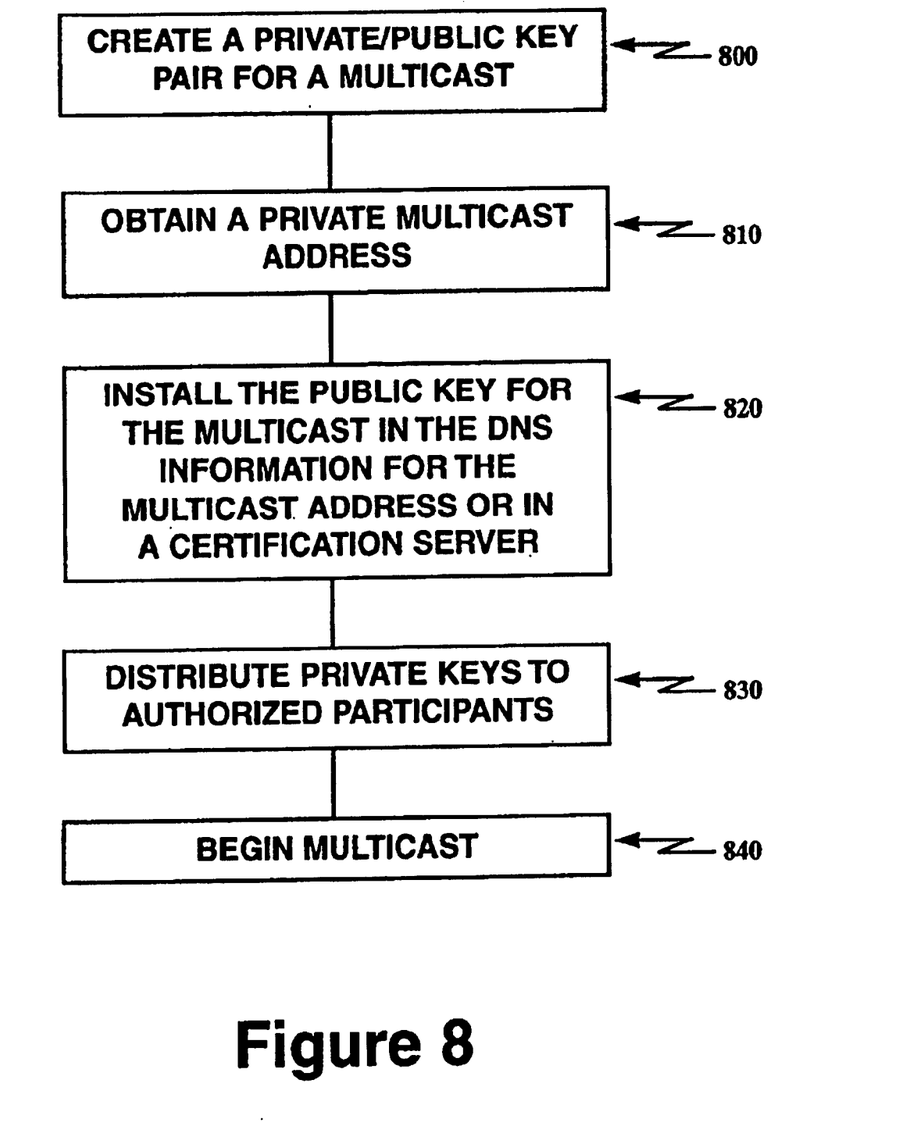
FIG. 8 is a flow chart of a process for setting up a private multicast in accordance with one aspect of the invention.

FIG. 8 is a flow chart of a process for setting up a private multicast in accordance with one aspect of the invention. A user desiring to set up a private multicast first creates a private/public key pair for the multicast (800). The sponsor or owner of the multicast obtains a private multicast address (810) for use during the multicast. This can either be a permanent assignment or a temporary assignment depending on need. The owner of the multicast or other designated party may install the public key for the multicast in the DNS information for the multicast address or in a certification server (820). The private key for the multicast is distributed to authorized participants in any of several known ways, but preferably over the network (830). At that time, the multicast is ready to begin (840). The receivers that desire to participate in the multicast then formulate an extended join request such as described in FIG. 5. If the user is authorized, the routing element will make that determination using the public key installed on the domain named server or on the certification server. When the routing element is satisfied that the request for joining the private multicast is genuine, the routing element will begin directing packets addressed to the multicast address to the user who submitted in the extended IGMP join request. However, if the user is not authorized (as discussed in conjunction with FIG. 6), the user will not be permitted to join the multicast and the routing element will not forward packets to the user.

Figure 9A:
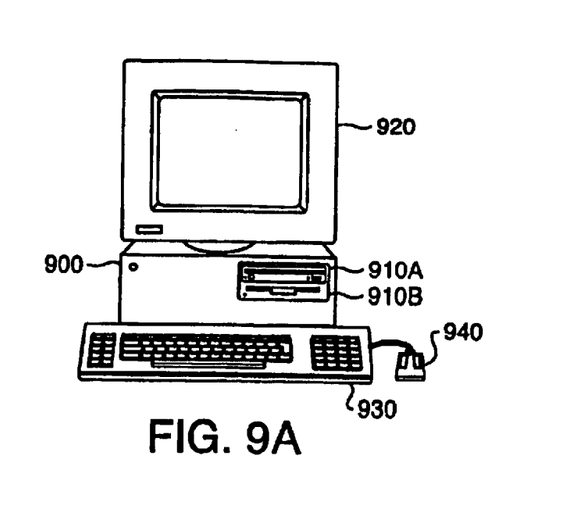
FIG. 9A illustrates a computer of a type suitable for carrying out the invention.

FIG. 9A illustrates a computer of a type suitable for carrying out the invention. Viewed externally in FIG. 9A, a computer system has a central processing unit 900 having disk drives 910A and 910B. Disk drive indications 910A and 910B are merely symbolic of a number of disk drives which might be accommodated by the computer system. Typically, these would include a floppy disk drive such as 910A, a hard disk drive (not shown externally) and a CD ROM drive indicated by slot 910B. The number and type of drives varies, typically, with different computer configurations. The computer has the display 920 upon which information is displayed. A keyboard 930 and a mouse 940 are typically also available as input devices. Preferably, the computer illustrated in FIG. 9A is a SPARC workstation from Sun Microsystems, Inc.

Figure 9B:
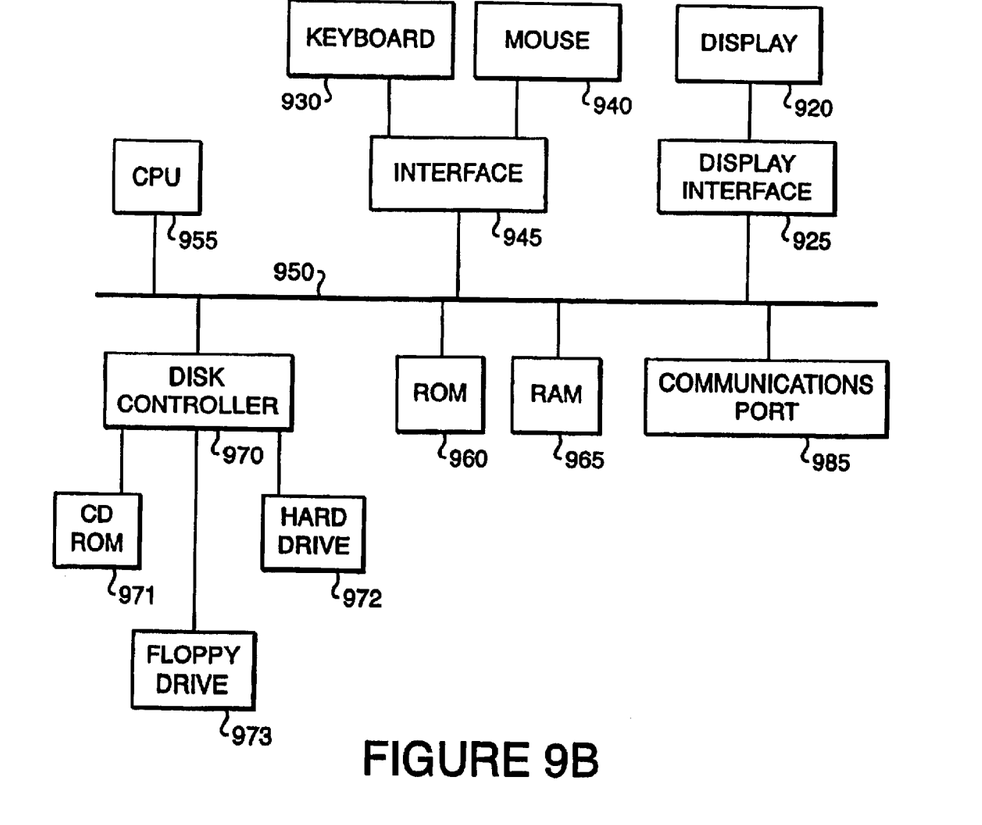
FIG. 9B illustrates a block diagram of the computer of FIG. 9A.

FIG. 9B illustrates a block diagram of the internal hardware of the computer of FIG. 9A. A bus 950 serves as the main information highway interconnecting the other components of the computer. CPU 955 is the central processing unit of the system, performing calculations and logic operations required to execute programs. Read only memory (960) and random access memory (965) constitute the main memory of the computer. Disk controller 970 interfaces one or more disk drives to the system bus 950. These disk drives may be floppy disk drives, such as 973, internal or external hard drives, such as 972, or CD ROM or DVD (Digital Video Disks) drives such as 971. A display interface 925 interfaces a display 920 and permits information from the bus to be viewed on the display. Communications with external devices can occur over communications port 985.

Computer 900 includes a communications interface 985 coupled to bus 950. Communications interface 985 provides a two-way data communications coupling to a network link to a local network such as 100D of FIG. 1. For example, if communications interface 985 is an integrated services digital network (ISDN) card or a modem, communications interface 985 provides a data communications connection to the corresponding type of telephone line. If communications interface 985 is a local area network (LAN) card, communications interface 985 provides a data communications connection to a compatible LAN. Wireless links are also possible. In any such implementation, communications interface 985 sends and receives electrical, electromagnetic or optical signals which carry digital data streams representing various types of information.

The network link typically provides data communications through one or more networks such as 100A–110D of FIG. 1, to other data devices. For example, the network link may provide a connection through local network to a host computer or to data equipment operated by an Internet Service Provider (ISP). An ISP may in turn provide data communications services through the world wide packet data communications network now commonly referred to as the "Internet". The local network and Internet both use electrical, electromagnetic or optical signals which carry digital data streams. The signals through the various networks and the signals on the network link and through communications interface 985, which carry the digital data to and from computer 900 are exemplary forms of carrier waves transporting the information.

Computer 900 can send messages and receive data, including program code, through the network(s), network link and communications interface 985. In the Internet example, a server might transmit requested code for an application program through Internet, ISP, local network and communications interface 986. In accordance with the invention, one such download application may include software implementing the techniques described herein.

The received code may be executed by processor 955 as it is received, and/or stored in storage devices 960 and/or 971–973, or other non-volatile storage for later execution. In this manner computer 900 may obtain application code in the form of a carrier wave.

FIG. 9 shows an architecture which is suited for either a user workstation or for a routing element. However, when configured as a routing element, I/O devices will normally only be attached during servicing. When configured as a router, a plurality of communications interfaces 985 will normally be provided, one for each port. When configured as a controller for a switch at a switching node, a hardware interface will be provided to link the bus 950 with a switching matrix.

Figure 9C:
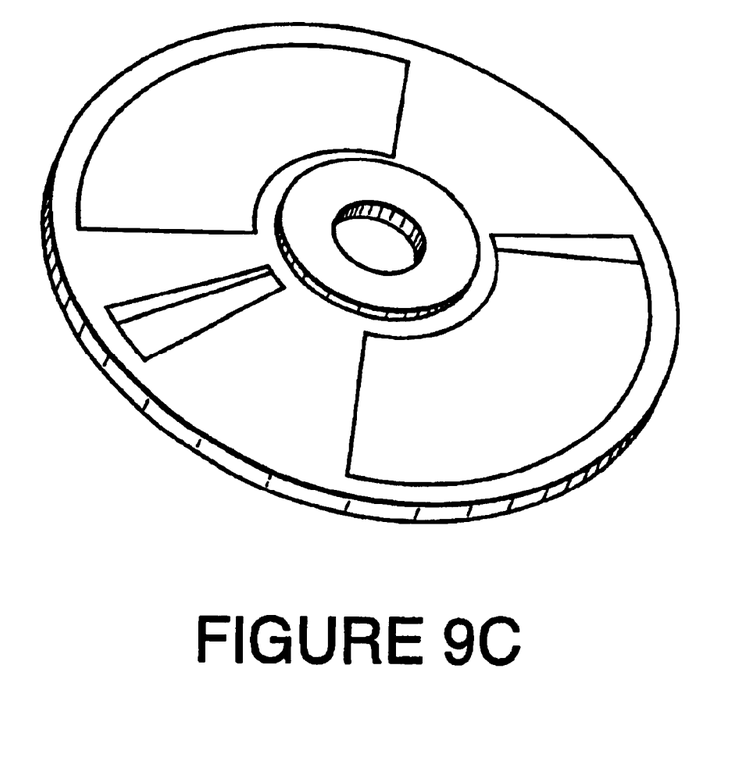
FIG. 9C illustrates an exemplary memory medium containing one or more programs usable with the computer of FIG. 9A.

FIG. 9C illustrates an exemplary memory medium which can be used with drives such as 973 in FIG. 9B or 910A in FIG. 9A. Typically, memory media such as a floppy disk, or a CD ROM, or a Digital Video Disk will contain the program information for controlling the computer to enable the computer to perform its functions in accordance with the invention.

The approach discussed above provides a simple general purpose interface that works across a spectrum of varying user needs. It does not unreasonability increase the overhead for setting up and operating the multicast for users who would like to continue to set up simple open meetings. The systems provides security even if outsiders know the IP address and/or port number which might otherwise enable them to misbehave or behave maliciously. The system is flexible in that it does not require the multicast sessions organizers to know the identity of all the senders and/or listeners in advance. It also permits users to dynamically join the discussions.

Even if the system is compromised, it is possible to reasonably limit the damage caused by excluding that user or group of users from the conference. The approach described here is also compatible with current and proposed mechanism and protocols for multicasting.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A routing element for multicast digital communications, comprising:
   a. at least one input port;
   b. at least one output port; and
   c. a processor for controlling packet routing from an input port to an output port, said processor configured to obtain a public key and to decode at least a portion of a multicast join request comprising encrypted information submitted by a user using said public key to verify that said user is authorized to join a multicast, and further configured to block multicast packets received from senders blocked from sending to a receiver as indicated by a bit-mask received with a multicast join request.

2. Apparatus for participating in a multicast, comprising
   a. a communication port; and
   b. a processor for controlling communications over said communications port; said processor configured to send a private multicast join request comprising first information and encrypted first information.

3. Apparatus of claim 2 in which said first information includes a first field identifying a user requesting participation in a particular multicast and said encrypted first information comprises a second field containing the results of encrypting at least one of said first field or a digest of said first field using a private key.

4. Apparatus of claim 2 in which said encrypted first information comprises a second field contains the results of encrypting one of said first field and a third field containing a randomly generated key or digest of said first field and said third field.

5. Apparatus of claim 2 in which said join request includes at least one bit-mask, a bit-mask specifying one of a group of senders permitted to send to said communications port and a group of senders prohibited to send to said communications port.

6. A method of operating a communications system comprising the step of:

provising a multicast address space having a subspace for public multicasts and a subspace for private multicasts.

7. A method of sending a multicast join request, comprising the step of:

a. sending first information including a user identification together with an encrypted version of said first information.

8. The method of claim 7 in which said first information further includes a random key.

9. A method of sending a multicast join request from a user, comprising the step of:

a. sending a list of bit-masks specifying at least one of a group of senders permitted to send to said user and a group of senders prohibited from sending to said user.

10. A computer program product, comprising:

a. a memory medium; and b. a computer program stored on said memory medium, said computer program comprising instructions for providing a multicast address space having a subspace for public multicasts and a subspace for private multicasts.

11. The computer program product of claim 10 in which said program is transmitted from said memory medium over a network interface.

12. A computer program product, comprising:

a. a memory medium; and b. a computer program stored on said memory medium, said computer program comprising instructions for sending a multicast join request, including a user identification together with an encrypted version of said user identification.

13. The computer program product of claim 12 in which said program is transmitted from said memory medium over a network interface.

14. A computer program product, comprising:

a. a memory medium; and b. a computer program stored on said memory medium, said computer program comprising instructions for sending a group specific multicast join request including a bit-mask specifying at least one of a group of senders permitted to send to said user and a group of senders prohibited from sending to said user.

15. The computer program product of claim 14 in which said program transmitted from said memory medium over a network interface.

* * * * *